Figure 7:
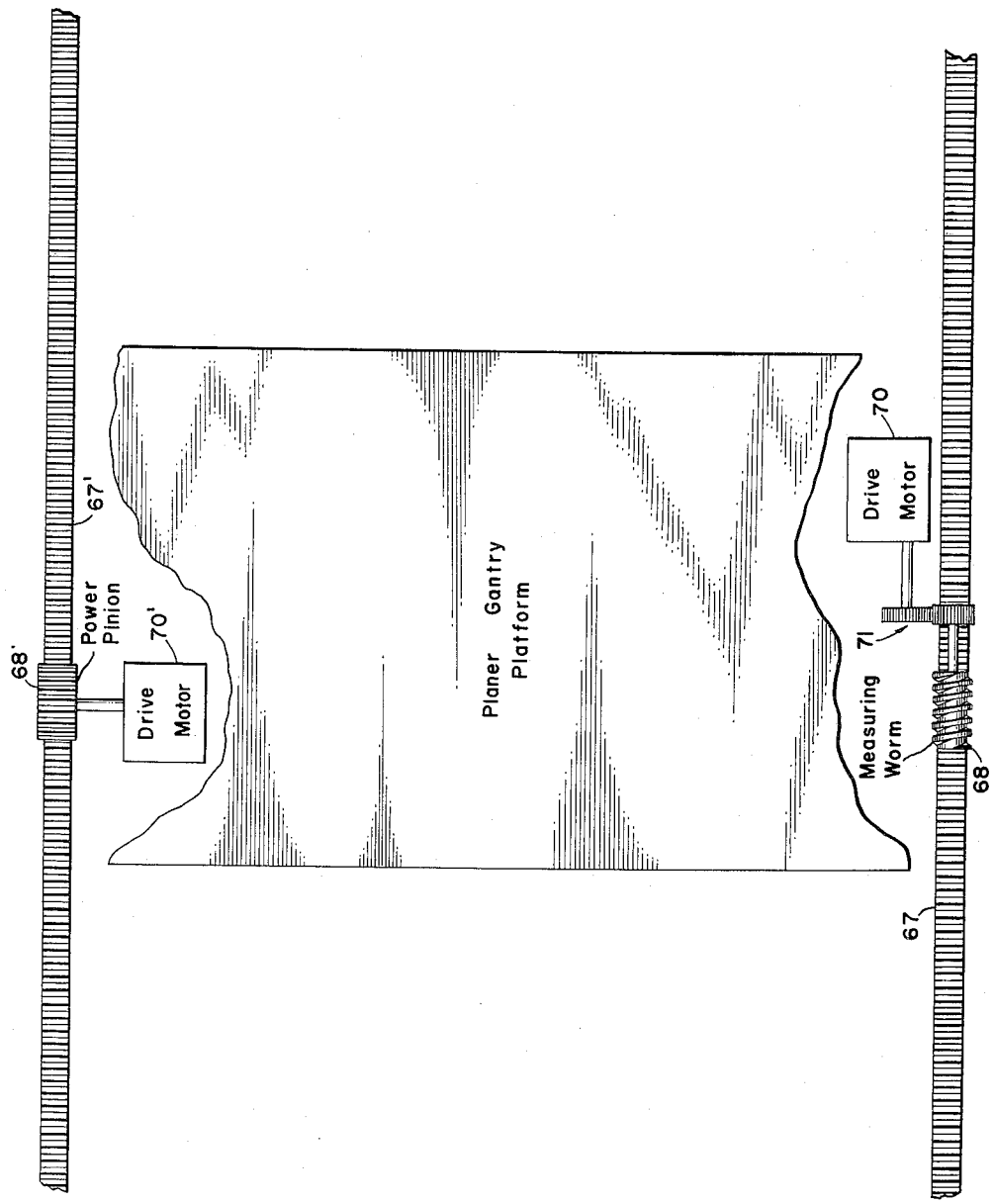

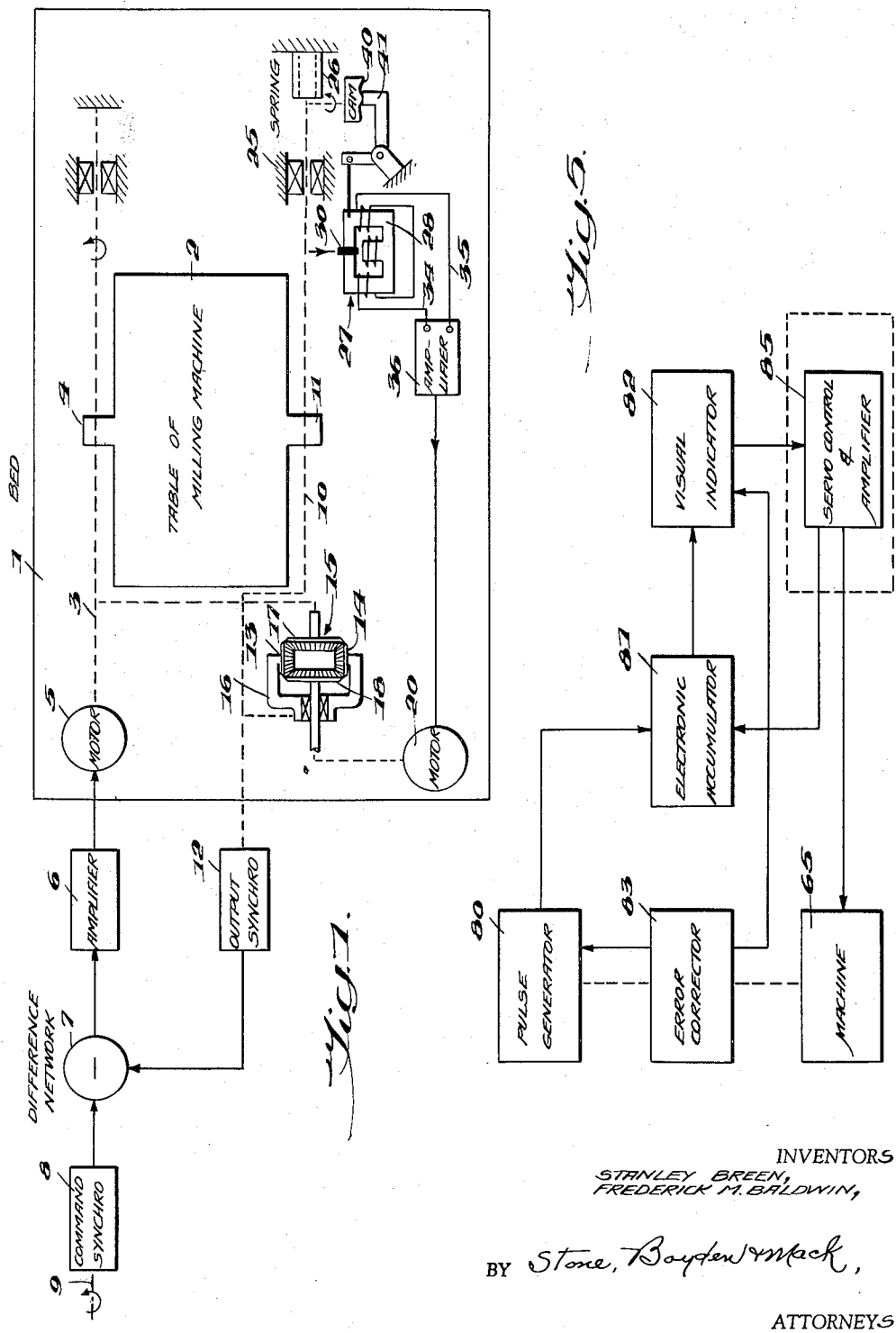

March 13, 1962 S. BREEN ETAL 3,024,708
ERROR CORRECTING SYSTEM
Filed Jan. 24, 1956 4 Sheets-Sheet 2
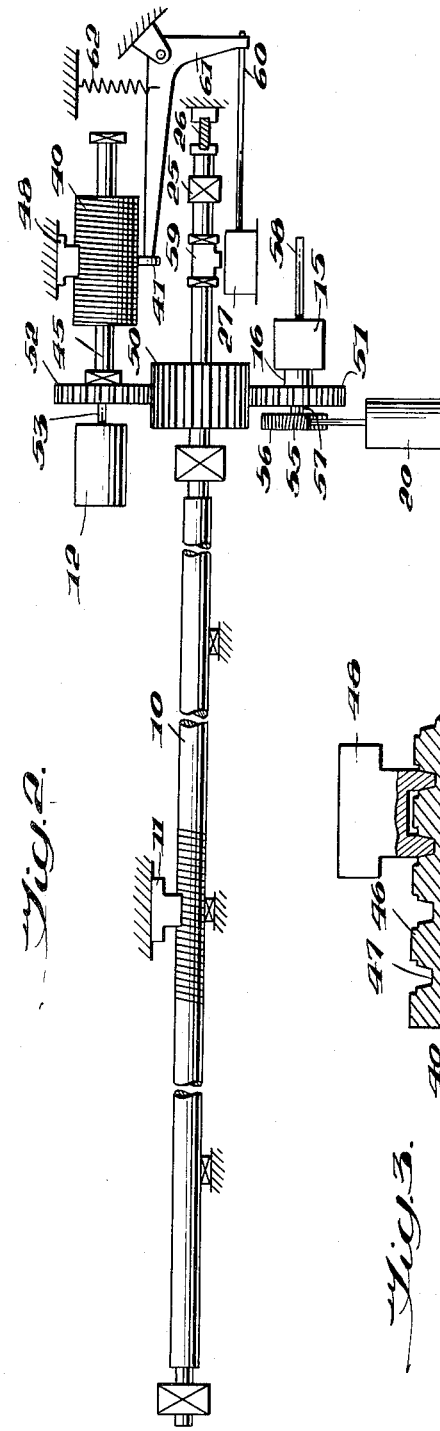
INVENTORS
STANLEY BREEN,
FREDERICK M. BALDWIN,
BY Stone, Boyden & Mack,
ATTORNEYS

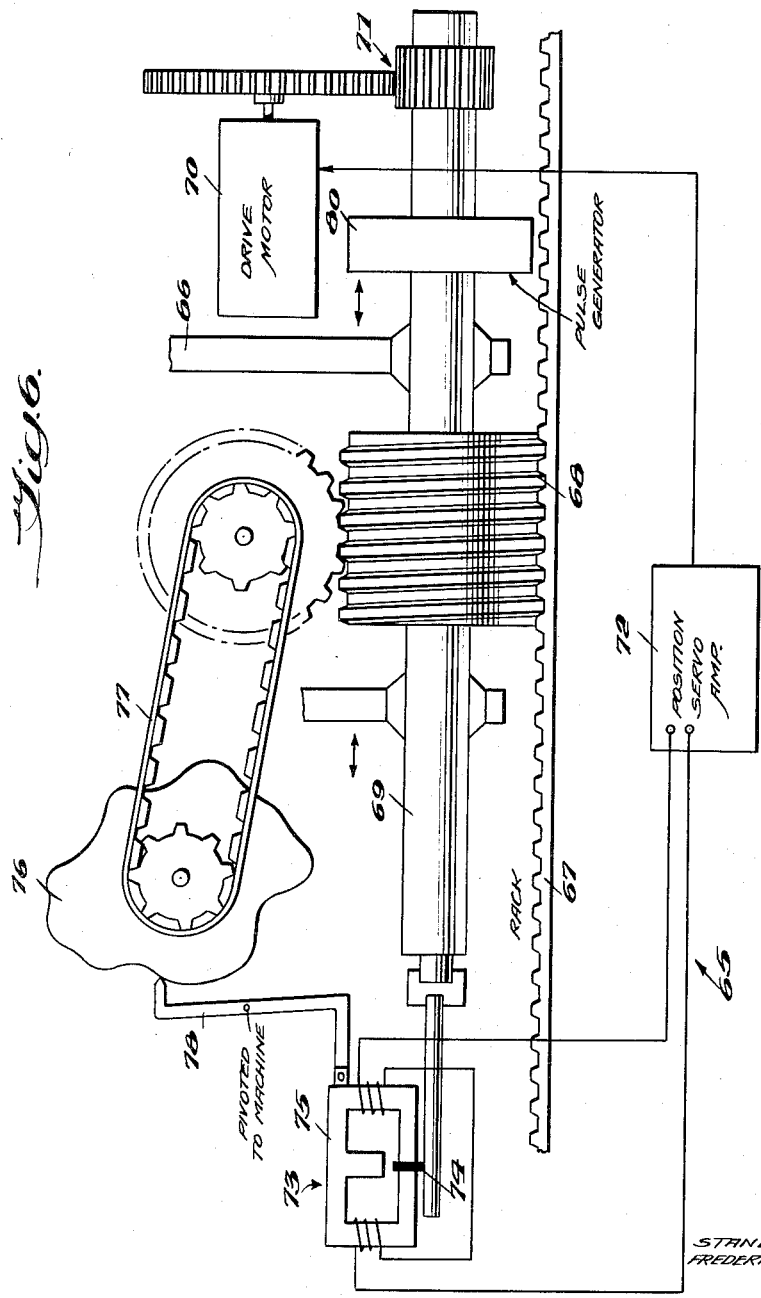

United States Patent Office 3,024,708
Patented Mar. 13, 1962

3,024,708
ERROR CORRECTING SYSTEM
Stanley Breen and Frederick M. Baldwin, Asheville, N.C., assignors to Amcel Propulsion Inc., a corporation of Delaware
Filed Jan. 24, 1956, Ser. No. 560,957
9 Claims. (Cl. 90—21)

This invention relates to machine tools, and, more particuarly, to an apparatus for correcting the erroneous outputs of instrument members for measuring the relative position of such tools.

Large machine tools, such as milling machines and planers, usually employ an instrument member of similar characteristics to the tool-positioning member for use in indicating the position of the tool, for visual indication to the tool operator or for feedback in an automatic control system, such as the numerically controlled M.I.T. milling machine. In a milling machine, for instance, a measuring lead screw, separate from the power lead screw, is provided, to isolate the control and measuring operations. In a rack and gantry type planer, a measuring rack and measuring worm or pinion separate from the power worm end cooperating rack are provided.

Many of these machine tools are of tremendous sizes, and their tools are movable over distances as great as 60 feet, or more, to properly position the tools with respect to large work pieces. The tool advancing means, such as the power lead screw in a milling machine and the rack in a rack and gantry type planer, must be of corresponding large length. Similarly, the instrument members for these tool advancing means must be very long.

It has been found that one difficulty in use of such long instrument members is the accuracy of manufacture of the instrument members. A measuring lead screw, or a measuring rack, for instance, must have threads, or teeth, of constant high-accuracy spacing in order that these instrument members will furnish a true indication of position of the tool. This is particularly important in automatic control of machine tools. However, it is very difficult, and correspondingly expensive, to cut a lead screw, or rack, with constant highly accurate incremental tooth spacing. An idea of how difficult it is, and of the high importance of such accuracy, may be gained by recalling that with the M.I.T. milling machine, one pulse from the director translates the table 0.0005 inch.

We have found, however, that an instrument member of standard production-line accuracy may be used, thus providing a substantial saving in money, if compensation for instantaneous and accumulative inaccuracies or errors in the manufacture of the instrument member is made. This invention provides an apparatus for compensating for instantaneous or incremental errors in such instrument members as an instrument lead screw or a measuring rack, by providing an output voltage having a characteristic indicative of such errors. This output voltage may be used to provide a correct visual indication of the position of the instrument member, or may be used in a feedback loop of an automatic control system.

The invention, more specifically, comprises a cam having a surface cut in correspondence with the incremental errors in the instrument member, a follower for sensing the changes in said surface, means for moving the cam with the instrument member (or its cooperating measuring element if the instrument member is fixed), and means controlled by the cam follower for supplying an output voltage having a characteristic changeable in accordance with movement of the cam follower.

The invention will now be more particularly described in conjunction with the accompanying drawings, showing preferred embodiments of the invention.

In the drawings,
FIG. 1 is a schematic showing of a milling machine and control therefor having the invention applied thereto;
FIG. 2 is a side elevation of the measuring lead screw of FIG. 1, and the cooperating parts of the invention and the control system;
FIG. 3 is a partial schematic view of the cam of FIGS. 1 and 2, to a larger scale;
FIG. 4 is a schematic showing of the output voltage supplying means of FIGS. 1 and 2;
FIG. 5 is a schematic diagram of a planer and control, showing the cooperation of the invention therewith;
FIG. 6 is an elevational view of a portion of a rack and gantry type planer having the apparatus of the invention applied thereto; and
FIG. 7 is a schematic view of the planer of FIG. 6 showing the relationship between the power pinion and rack and the measuring worm and rack.

The apparatus of FIGS. 1 through 4 constitutes the application of the present invention to a milling machine. The milling machine includes a bed 1 on which a table 2 is movable along ways in the bed (not shown) to position the tool carried by the table appropriately with respect to the work. In large milling machines, the extent of movement of the table along the ways in the bed is very large, extending as high as 60 feet, or higher. In order to provide for movement of the table, a power lead screw, shown only by dashed line 3 in FIG. 1, is employed. The power lead screw cooperates with a nut 4 fixed to the table 2 in such fashion that rotation of the lead screw causes translation of the table along the bed. Rotation of the power lead screw is controlled by motor 5 which may appropriately be controlled manually. However, in this instance, the motor is controlled by the voltage output of an amplifier 6 which in turn receives its input voltage from a difference network 7. One of the inputs to the difference network is received from a command synchro 8. The command synchro may be of the usual control transmitter type, providing an output voltage varying in phase and magnitude with rotation of a shaft 9. Shaft 9 may be controlled manually, or, if automatic controlling means is to be used, appropriate apparatus for automatic control of the position of shaft 9 may be provided. The synchro control transmitter is well known to the art and is described in Ahrendt, "Servomechanism Practice," McGraw-Hill 1954, pages 30–37.

In order to provide for sensing of the position of the table with respect to the bed, the milling machine table 2 is provided with a measuring lead screw 10 which is rotatable with respect to a nut 11 fixed to the table. The measuring lead screw, like the power lead screw, is very long.

It will be obvious that the measuring lead screw could be used to drive a suitable indicator, but in this case it is designed to form a part of a feedback loop for controlling the motion of motor 5. To effectuate such control, the measuring lead screw 10 is connected to the shaft of an output synchro 12, through appropriate gearing, and is also connected to drive gears 13 and 14 of a differential 15. Synchro 12 may be of the same design as synchro 8.

The combination of the command synchro 8, the output synchro 12, the difference network 7, the amplifier 6 and the motor 5 is not in itself novel but rather comprises a conventional closed loop control system of the type disclosed in Kaplan, "Automation of Machine Tools," The Tool Engineer, April 1953, pages 56 and 57, and in Pease, "An Automatic Machine Tool," Scientific American, volume 187, September 1952, pages 101–110, especially page 106. The block diagram type of illustration employed here is conventional in the machine tool control field, as indicated by FIG. 1 of the patent to Attura, 2,747,162, issued May 22, 1956, and filed March 13, 1953. The elements of this conventional combination are themselves well known and are disclosed in such basic texts as "Basic Synchro and Servomechanisms," a Rider publication. In this text, pages 1–15 and 1–18 disclose appropriate synchros, pages 2–1 to 2–13 disclose appropriate difference networks, and pages 2–20 to 2–44 and 2–79 to 2–91 disclose appropriate amplifiers and motors.

Gears 13 and 14 of differential 15 are fixed together by a sleeve 16. A third gear, 17, of the differential is connected to rotate with power lead screw 3, and the fourth gear 18 is driven by a motor 20.

The differential 15 is of conventional type, in which the angular position of gears 13 and 14 (and hence of measuring lead screw 10) is equal to one half the vector sum of the angular positions of gears 17 and 18 (and hence of the power lead screw 3 and the shaft of motor 20).

Motor 20 is supplied with controlling voltage by the arangement now to be described.

In operation of such large machines as that illustrated in FIG. 1, excessive friction between power lead screws and nuts and backlash therebetween often cause errors in positioning of the table. In order to compensate for such errors, it has been suggested to provide the measuring lead screw with a device for sensing such errors and compensating therefor. In the apparatus of FIG. 1, such a device includes mounting the measuring lead screw in a bearing 25 constructed to permit axial movement of the measuring lead screw against the coercive force of a spring 26. The means for sensing such axial movement of the measuring lead screw caused by excessive friction, or other conditions impeding proper movement of the power lead screw, includes means for supplying an output voltage having a characteristic determined by the relative position of two relatively movable members. Such a means is shown specifically in FIG. 4, but it is identified in FIG. 1 with reference numeral 27. An apparatus known as a "Metrisite," manufactured by Graydon Smith Products Corporation, West Concord, Massachusetts, is usable for this purpose. The "Metrisite" includes a three-legged magnetic core 28 having an air gap 29 in its center leg. A loop 30 of conducting material is slidable along the outer leg of the core adjacent the air gap. A.-C. voltage is supplied to a coil 31 wound on the center leg of the core to cause a magnetic flux pattern to be set up in the core. A pair of coils 32 and 33 are mounted on the outer legs of the core and connected in series opposition to provide an output voltage across leads 34 and 35.

The output voltage of the "Metrisite" has a phase determined by at which side of the centerline of the center leg of the core the loop 30 is positioned and an amplitude determined by the amount of displacement of the loop with respect to the centerline. A voltage of one phase is delivered when the loop is at one side of the centerline, while a voltage of opposite phase is delivered when the loop is at the other side of the centerline. These characteristics are explained by the fact that, when the loop 30 moves to one side of the center-line of air gap 29, the flux in the core portion at the other side of the center-line predominates. Thus, if the loop moves to the left of FIG. 4, the voltage across coil 33 will be larger than that across coil 32 and the output voltage, being the difference between the two coil voltages, will be of one phase. If the loop moves to the right of FIG. 4, the voltage across coil 32 will be larger and the output voltage will therefore be of the opposite phase.

Loop 30 of the "Metrisite" is fixed to measuring lead screw 10 to move in correspondence with axial movement thereof. The output voltage of the "Metrisite" is amplified by amplifier 36 and employed to control motor 20.

As a result of the arrangements described above, the angular positions of the measuring lead screw, gears 13 and 14, and the shaft of output synchro 12 yield a true indication of linear table position, as defined by the measuring lead screw. However, the angular position of the measuring lead screw is still not necessarily an indication of the actual linear position of the table 2, because the measuring lead screw, if manufactured by normal production-line techniques, has substantial errors along its length in thread spacing. Since we intend to employ a measuring lead screw which is relatively simple and inexpensive to manufacture, and which therefore has relatively wide tolerances, the errors in incremental thread spacing along the length of the measuring lead screw 10 are substantial and vary in both magnitude and direction along the length of the screw.

The purpose of this invention, namely compensating for errors in the lead screw, is accomplished by cutting a cam 40 to have a surface varying in accordance with the errors in the measuring lead screw along the length of the lead screw. The changes in the surface in cam 40 are sensed by cam follower 41 pivoted to the bed 1 of the milling machine. The other end of the cam follower drives the core 28 of "Metrisite" 27. Consequently, amplifier 36 receives a voltage indicative not only of axial movements of the measuring lead screw in response to errors caused by excessive friction, backlash, and the like, but also a voltage corresponding to the errors in the incremental thread spacing of the measuring lead screw along its length. The angular position of the measuring lead screw, therefore, is a true indication of the position of table 2, with the result that the power lead screw 3 is controlled by motor 5 in accordance with an exact relationship between the position to which it is directed by the command synchro 8 and the position which it is actually in at the instant.

Referring now to FIG. 3 before entering into a discussion of the apparatus of FIG. 2, the cam 40 will be seen to be a drum-mounted member splined on a shaft 45, thus providing for axial movements of the cam along shaft 45. Cam 40 is provided with threaded surfaces 46 and 47, respectively. The outer cam surface 46 is used to drive cam follower 41 and has a radial extent variable along its helical length depending upon the sense and extent of error in the instrument screw 10 along its corresponding length. There must, of course, be provided some means to rotate cam 40. In order to permit rotation thereof without undue wear on cam surface 46, inner threading 47 is provided. This threading, like threading 46, is helical, and it cooperates with a fixed half nut 48 to provide for translation of the cam.

Since cam 40 experiences only small forces during its operation, it can be made relatively small and of quite fine pitch. Consequently, cam 40 may be cut to have its surface 46 represent the errors in incremental thread spacing of measuring lead screw 10 of 60 feet or more, though cam 40 only be a foot or so long.

FIG. 2 shows a portion of the apparatus of FIG. 1 in side elevation. In FIG. 2, the measuring lead screw 10 carries a gear 50 which drives a gear 51 fixed to sleeve 16 of differential 15. Gear 50 also drives a gear 52 fixed to the shaft 53 of output synchro 12. Gear 52 also drives shaft 45 on which cam 40 is splined. Consequently, the measuring lead screw 10 drives gears 13 and 14 and the shaft of the output synchro 12, so that the angular positions of these elements are continuously in correspondence.

Servo motor 20 drives a worm 55 which meshes with a gear 56 fixed to shaft 57, the latter driving gear 18 of the differential. Gear 18 is thereby controlled in angular position in accordance with the output voltage of amplifier 36.

The power lead screw 3 drives gear 17 of the differential through a train including shaft 58.

The conducting loop 30 of the "Metrisite" is positioned in accordance with the axial position of measuring lead screw 10 through a member 59 fixed to the lead screw and to the loop. The core of the "Metrisite" has its position controlled by the cam 40 through a rod 60 fixed to one arm of a bell crank lever 61 whose other arm carries the cam follower 41. As shown, the drive cam follower 41, carried at one end of bell crank lever 61, is held in contact with the outer cam surface 46 by a spring 62 fixed to the bed and to the lever.

In operation of the apparatus of FIGS. 1-4, when shaft 9 is rotated to cause movement of the power lead screw, command synchro 8 provides an output voltage to difference network 7. Initially this voltage is unopposed in the difference network, so that a voltage is supplied to amplifier 6, amplified there, and supplied to motor 5 to rotate the motor in accordance with the magnitude and direction of rotation of shaft 9. The rotation of motor 5 causes corresponding motion of power lead screw 3. If there is no backlash, rotation of screw 3 will immediately cause linear translation of table 2, resulting in rotation, without translation, of measuring screw 10. This rotation of screw 10 will cause corresponding rotation of the shaft of output synchro 12, and the output synchro will supply a voltage to difference network 7 which bucks the voltage from command synchro 8. During this rotation of the measuring lead screw and translation of the table, the cam 40 will also rotate in such manner that the radial dimension of cam surface 46 opposite cam follower 41 indicates the magnitude and direction of the error in the lead screw at each instant. The cam follower causes motion of the bell crank lever 61 and rod 60 to move the core 28 of the "Metrisite" in correspondence with that error, so that the "Metrisite" provides an output voltage of amplitude and phase indicative of the error. This voltage, after amplification by amplifier 36, is applied to control motor 20 to drive gear 18 of the differential to a position dependent upon the instantaneous measuring screw error. The rotation of gear 18 causes rotation of gears 13 and 14, and hence of the measuring screw and the shaft of the output synchro, of direction and magnitude such as to compensate for the error in the measuring screw. The output of the output synchro is hence a true indication of the linear position of the table so that motor 5 stops when the table has reached the position directed by the position of shaft 9.

If there is backlash in the power lead screw, the screw rotates at first without causing translation of the table. This causes rotation of gear 17, and hence of the measuring lead screw. But, since the table has not as yet moved, rotation of the measuring lead screw causes axial translation thereof. Since the conducting loop 30 of the "Metrisite" is fixed to the measuring lead screw, it moves therewith, with respect to the core of the "Metrisite," and causes an output voltage to be delivered to the amplifier 36. The amplified voltage rotates motor 20 to rotate gear 18. Since gear 18 is subtracting, with respect to gear 17, in its effect on gears 13 and 14, the measuring lead screw is rotated back to its original position and remains there until the backlash in the power lead screw is overcome. Then the table translates and the measuring lead screw rotates, in the manner described above.

It will be evident from the above that we have described an apparatus that will correct or compensate for any errors in the incremental pitch of a measuring lead screw along the length of such screw, which may be extremely large. The corrections directed by helical surface 46 of cam 40 may be applied, as shown to a feedback loop for control of the position of the table 2 of the milling machine, or they may be employed to actuate an indicator to show the operator of the machine tool the correct position of the table.

As stated in the preliminary portion of this specification, the apparatus of this invention is usable in conjunction with a rack and gantry type planer, as well as a milling machine. Such a planer is shown schematically at 55 in FIG. 5 and includes the usual power tool (not shown) supported by a gantry-type platform 66, of FIG. 6. The power pinion and power rack of the apparatus are shown schematically at 68' and 67', respectively, and are of conventional form. A suitable drive motor 70' is shown as driving the pinion to reciprocate the gantry along the rack. The measuring rack 67 of the apparatus is shown in FIG. 6, as well as FIG. 7, and extends over an extremely long distance commensurate with the extent of movement of the gantry. As with the measuring lead screw of the other embodiment of this invention, rack 67 is of production-line accuracy, and contains incremental tooth-spacing errors along its length. Cooperating with the rack is a measuring worm 68 mounted on a shaft 69 carried by gantry 66. Since rack 67 is stationary, movement of the gantry will cause rotation of the worm 68 and shaft 69 causing translation of the worm along the length of the measuring rack 67. Any other rotation of the worm is accomplished by an independent power source.

Shaft 69 of the worm is driven by drive motor 70 through a conventional gearing train 71. Drive motor 70 is controlled by voltage supplied by a conventional form of servo amplifier 72. Appropriate motors and amplifiers are disclosed, e.g. in "Basic Synchros and Servomechanisms," supra, pages 2-20 to 2-44 and 2-74 to 2-91.

As with the previously described embodiment of the invention, this embodiment is provided with a "Metrisite" 73 including conducting loop 74 and core 75. This "Metrisite" is constructed as shown in FIG. 4, so it will not be more fully described at this time.

The conducting loop 74 of "Metrisite" 73 is fixed to shaft 69 to move in accordance with translation of the worm.

This apparatus is provided with an error eliminating cam 76, which may be of similar construction to that shown in FIGS. 2 and 3. Consequently, the cam is shown in FIG. 6 only diagrammatically. Cam 76 is driven through a gear and chain arrangement 77 by worm 68, so that its rotation corresponds with rotation of the worm, and therefore with movement of the worm with respect to measuring rack 67. A cam follower 78 cooperates with the surface of cam 76 and is pivoted between its ends to the gantry. The other end of cam follower 78 is fixed to the core of the "Metrisite" to move it in correspondence with changes in the surface of the cam dictated by inaccuracies in the incremental tooth spacing of the measuring rack 67 along its length.

The apparatus of FIG. 6, therefore, provides an input to servo amplifier 72 which is dependent upon errors in rack 67, as detected from cam 76 and the difference in position of the gantry and worm from normal position. Drive motor 70 for shaft 69 is therefore controlled in accordance with the relative position of the gantry with respect to the measuring rack 67, despite any inaccuracies in the manufacture of the measuring rack. The rotational position of shaft 69, then, may be employed to drive a suitable indicator, or may be employed in an automatic control system for the advancement of the gantry along the rack. FIG. 5 shows its employment in both type systems.

As shown in FIGS. 5 and 6, shaft 69 drives a pulse generator 80 which may be of any suitable type for providing voltage pulses of a number indicative of the rotational position of the shaft. For instance, the pulse generator may comprise a wheel mounted on the shaft having a photocell system associated with segments along the periphery of the wheel of differing optical characteristics. The output pulses from the photocell system caused by rotation of the wheel then furnish an indication of the rotational movement of the shaft 69. Patent No.

2,537,427 issued in the name of Seid et al. on January 9, 1951, discloses an appropriate generator. The output of the pulse generator is supplied by an appropriate connection, which may include a pair of lines, one for clockwise, and the other for counter-clockwise, rotation of shaft 69, the two lines being connected to an electronic accumulator 81. The electronic accumulator is designed to remember the number of pulses it has previously received from the pulse generator, and to add or subtract the pulses currently received therefrom, depending upon in which direction shaft 69 is then rotating, and to control an output shaft in accordance with the sum or difference of such pulses. Since this apparatus is conventional and is of no specific importance to this invention, it will not be further described herein. The Seid et al. patent also discloses an appropriate accumulator in counter 14 thereof. The output shaft of the electronic accumulator 81 may be used to rotate a visual indicator 82. This indicator may be of the calculator type, having a number of discs with numerals from 0 to 9 spaced around the periphery of each disc, the discs being positioned on an appropriate shaft and having one of each of their numerals displayed through an appropriate viewing slot. The indicator then may show the exact position of the shaft 69 to, for instance, 7 digits. Such an indicator is disclosed at page 83 of the May 1955 issue of "Automation" and is available from Sigma Instruments, Inc., Boston, Massachusetts.

The error correcting apparatus of FIG. 6 is shown merely in block form in FIG. 5 and identified there as 83. It includes the cam and cooperating "Metrisite," as well as the drive mechanism for linking these two apparatuses.

The apparatus so far described will furnish an accurate visual indication to a machine tool operator of the exact position of the gantry with respect to the neck. However, if it is desired to control the tool position automatically, the system is readily adaptable to automatic servo control. To provide such control, a servo system such as identified at 85 in FIG. 5 may be used. The output of the visual indicator 82 would then control the input of the servo control, and the servo output would be used to drive the power worm and the electronic accumulator, thus providing a control and feedback loop for the apparatus. These elements and connections of FIG. 5 need not be more fully described, because they can well be of conventional form, similarly to amplifier 6 and motor 5 of FIG. 1, and they are not specifically important to this invention.

We have now described two widely varying embodiments of the present invention. Both embodiments depend upon a cam having a surface cut in correspondence with errors in an instrument member, and a device for providing an output voltage indicative of the relative movement between two movable members. The latter of these two devices is at present purchasable on the market. However, the cam would have to be cut in correspondence with the measuring screw or rack with which it is to be used. The cam blank could be selected to have an outside diameter which is at least as great as that necessary to correspond with the maximum error in one direction of the lead screw or rack tooth spacing. The incremental errors in tooth spacing along the extent or length of the instrument member may then be measured, for instance, with calipers, Johannason blocks, dial indicators, etc., and the cam surface cut along its length to correspond with these incremental errors. This could be accomplished while the instrument member is in position in the machine with which it is to be used. Once the cam is completed, of course, it will be used only with this instrument member.

The apparatus of the invention has been described in accordance with a rotatable cam. However, it will be evident that the cam surface could be unrolled and positioned, for instance, lengthwise of the bed of the machine, and the follower travel with the table along the cam surface. The claims, therefore, are not to be considered limited to a rotatable cam, but rather cover a lineal cam, as well.

It will be evident that it is not necessary that a "Metrisite" be used to detect the cam information and axial displacement of the measuring lead screw or measuring worm. Any apparatus which can translate displacement into a signal indicative thereof in both sign and amplitude can be used. Specifically, a "Linear Differential Transformer," manufactured by The Gudeman Company, of Chicago, Illinois, could also be used. This detector includes a transformer having an input winding and a pair of opposed output windings with an A.C. voltage supplied to the input winding and a core movable in the magnetic fields of the windings to vary the relative voltages of the output windings.

Moreover, the invention is not to be considered limited to use of a worm with a measuring rack, as shown in the rack-and-gantry planer of this application, since a pinion could be used in place of the worm.

The prime objective of this invention is correction of the angular position of a rotatable device, which may be, for instance, a lead screw (as in FIGS. 1 and 2, or a worm as in FIG. 6) whose angular position represents the relative position of a movable element (such as the table of FIG. 1 or the gantry of FIG. 6) to compensate for errors in an elongated measuring member (which may be a lead screw as in FIGS. 1 and 2 or a rack as in FIG. 6). This objective is accomplished by development of an electrical voltage (by element 27 of FIG. 4) representative of the errors in the elongated measuring member and by control of the angular position of the rotatable device (the lead screw of FIGS. 1 and 2 or the worm of FIG. 6) with that voltage, as by the motor 20 and differential 15 of FIGS. 1 and 2, and the servo amplifier 72 and drive motor 70 of FIG. 6. As is indicated in FIG. 5, the angular position of the rotatable device may be used to furnish an indication of the position of the movable element (visual indicator 82) and may be used to control that position (by servo control 85).

It will be obvious that many minor modifications could be made in the above embodiments. Consequently this invention is not to be considered limited to the embodiments specifically described herein, but rather is limited only by the appended claims.

We claim:

1. In a machine tool of the type comprising a frame, a movable element for accomplishing relative movement between the work and the tool which is to act thereon, power means operatively connected to said movable element to move it over a relatively large range of travel, and position measuring means operatively connected to said movable element and including a pair of relatively movable devices, one of which is rotatable to an angular position indicative of the relative position of said movable element, one of said devices being a measuring member having a length corresponding to the range of travel of said movable element and having inherent errors in its construction; means operated by said position measuring means for correcting the position of said rotatable device for such errors, said last-named means comprising an electrical device having first and second parts movable with respect to each other, said electrical device including means for providing an electrical output having a characteristic indicative of the relative positions of said first and second parts, a shaft operatively connected to said position measuring means to rotate in response to rotation of said rotatable device, a cam provided with a surface corresponding in shape to the errors in said measuring member, a cam follower disposed to move in accordance with the surface of said cam upon relative movement therebetween, one of said cam and cam follower being operatively connected to said shaft for relative movement thereby relative to the other, means connecting said cam follower to one of the movable parts of said electrical device to move it relative to the other part and thereby to develop an electrical output indicative of the surface conformation of said cam, and means supplied with said electrical output operative to rotate said rotatable device to an angular position corrected against such errors.

2. Apparatus in accordance with claim 1 and wherein said measuring member is a lead-screw whose angular position indicates the relative position of said movable element and the other relatively-movable device is a nut operatively engaged with said screw, said screw being mounted for both rotary movement, as said movable element travels therealong, and limited axial movement, and said other movable part of said electrical device is connected to said lead screw for movement thereby relative to said one part upon axial movement of the lead screw.

3. Apparatus in accordance with claim 1 and wherein said measuring member is a rack and the other relatively-movable device is a worm whose angular position indicates the relative position of said movable element operatively engaged with said rack, said shaft being driven by said worm.

4. Apparatus in accordance with claim 1 and further comprising electro-mechanical means responsive to the output of said electrical device for controlling said power means in accordance with errors in said measuring member as represented by said output.

5. In a machine tool, the combination of a bed, a table movable with respect to the bed to accomplish relative movement between the work and the tool which is to act thereon, drive means for said table comprising a rotatable power lead screw and a motor connected to rotate the same, said power lead screw being greatly elongated in order to provide a large range of movement for the table, a measuring lead screw and a nut engaged therewith and mounted on to said table, differential gearing having one input gear connected to said power lead screw and an output gear connected to said measuring lead screw, an output synchro connected to rotate with said measuring lead screw and constructed to supply a first voltage having a characteristic indicative of the extent and direction of rotation of the measuring lead screw, a command synchro constructed to provide a second voltage having a characteristic indicative of the extent and direction of the desired rotation of the power lead screw, electrical means connected to the output of said synchros and constructed to compare said voltages and to supply an electrical output representative of the differences of said characteristics of said voltages, means connecting the output of said electrical means to said motor to control the same, said measuring lead screw having a length corresponding to that of said power lead screw and having errors in its thread spacing, and means for correcting the rotational position of said measuring lead screw to compensate for said errors, said last-mentioned means comprising an electrical device having first and second parts movable with respect to each other, said electrical device including means for providing an electrical output having a characteristic indicative of the relative positions of said first and second parts, a cam provided with a surface corresponding in shape to the errors in thread spacing of said measuring lead screw, means operatively connecting said cam to said measuring lead screw to move said cam in accordance with rotation of said measuring lead screw, a cam follower disposed to move in accordance with the surface of said cam as the latter is moved, means connecting said first part of said electrical device to said cam follower, said measuring lead screw being mounted for limited axial movement, said second part of said electrical device being connected to said measuring lead screw for movement relative to the first part in response to axial movement of the screw, and a motor connected to said electrical device and operable to drive the other input gear of said differential gearing.

6. The apparatus of claim 1 including a visual indicator for indicating the position of said movable element of the machine tool, and means for controlling said indicator in accordance with said electrical output.

7. The apparatus of claim 5 in which said cam has a thread-like helical surface of radial extent corresponding with incremental thread spacing of said measuring lead screw, and including means for rotating said cam with rotation of said measuring lead screw.

8. The apparatus of claim 7 in which said cam has a second helical threaded surface, and including a nut cooperating with said second surface to cause translation of said cam in accordance with movement of said table, said cam follower cooperating with said first-mentioned helical surface of the cam.

9. In a machine tool and control of the rack and gantry type, said gantry being movable along the rack to position the tool with respect to the rack, a shaft driven power pinion cooperable with the rack to move the gantry with respect thereto, said rack being of great length to provide for a large range of movement of the gantry, a measuring rack fixed with respect to the first-mentioned rack, a measuring worm, a motor for driving said measuring worm, said measuring rack having a length corresponding to that of the first-mentioned rack and having errors in its tooth spacing so as to provide an inaccurate angular position of the measuring worm; apparatus for correcting the angular position of the measuring worm against such errors comprising means including a pair of relatively movable parts operable to supply an output voltage having a characteristic indicative of the relative position of said parts, one of said parts being fixed to the shaft of said measuring worm to translate with the worm along the measuring rack, a cam having a surface cut in correspondence with errors in tooth spacing of the measuring rack, a cam follower movable in accordance with changes in the surface of the cam, means for moving one of said cam and cam follower with respect to the other in correspondence with rotation of said measuring worm, said other part of the output voltage supplying means being movable with said cam follower, and means for controlling said motor in accordance with said output voltage to drive the measuring worm to a position compensated against such errors.

References Cited in the file of this patent

UNITED STATES PATENTS 2,748,665     Senn                   June 5, 1956

FOREIGN PATENTS 607,702     Great Britain             Sept. 3, 1948

UNITED STATES PATENT OFFICE
CERTIFICATE OF CORRECTION

Patent No. 3,024,708                                  March 13, 1962

Stanley Breen et al.

It is hereby certified that error appears in the above numbered patent requiring correction and that the said Letters Patent should read as corrected below.

Column 3, line 23, for "arangement" read -- arrangement --; column 7, line 36, for "neck" read -- rack --.

Signed and sealed this 17th day of July 1962.

(SEAL)
Attest:

ERNEST W. SWIDER                          DAVID L. LADD
Attesting Officer                            Commissioner of Patents